UNITED STATES PATENT OFFICE.

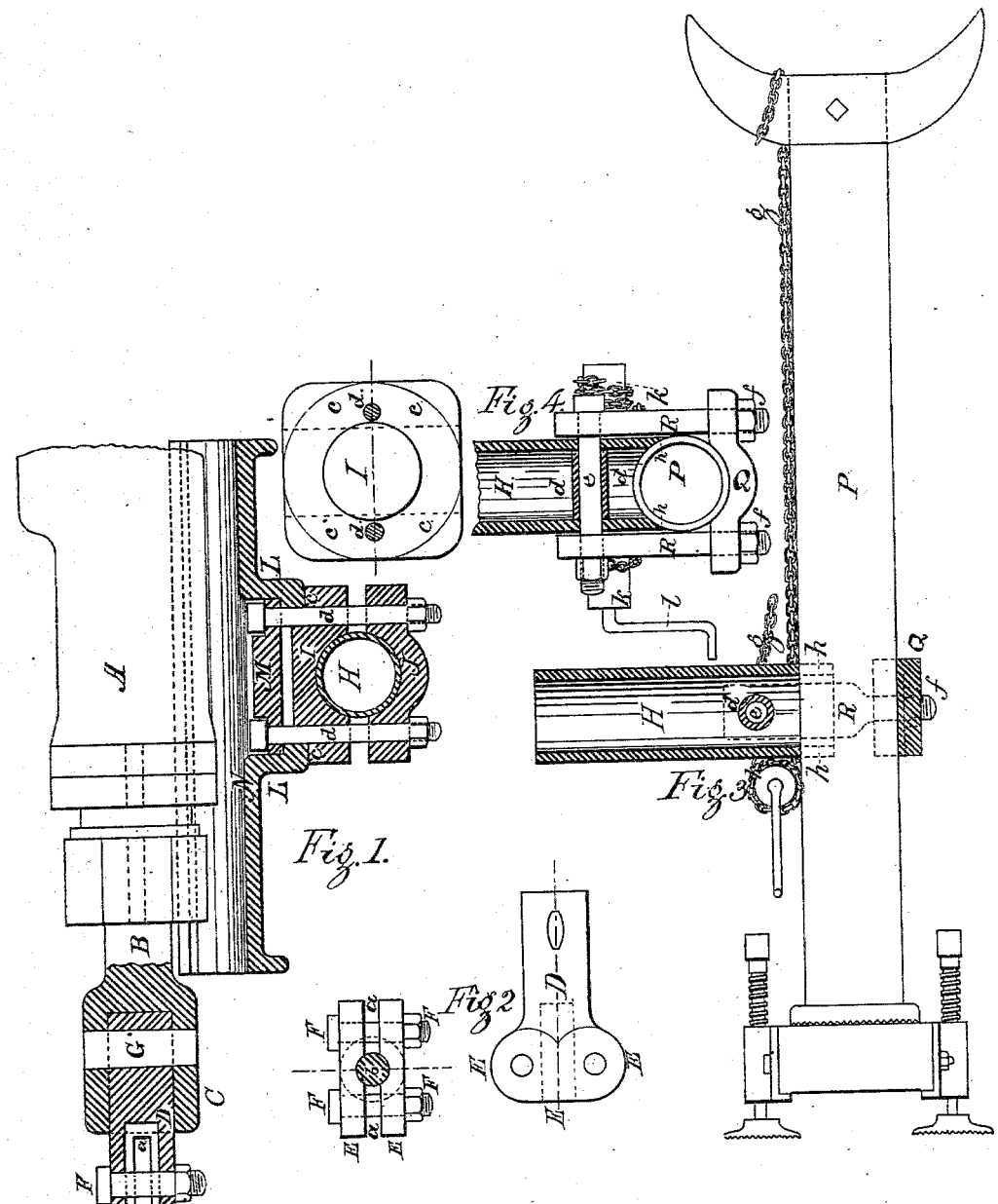

DE VOLSON WOOD, OF BOONTON, NEW JERSEY.

ROCK-DRILL.

SPECIFICATION forming part of Letters Patent No. 296,660, dated April 8, 1884.

Application filed June 12, 1882. (No model.)

*To all whom it may concern:*

Be it known that I, DE VOLSON WOOD, a citizen of the United States, residing at the city of Boonton, county of Morris, and State of New Jersey, have invented certain new and useful Improvements in Machines for Drilling Rocks, of which the following is a specification.

My invention relates to improvements in rock-drills operated by steam or compressed air; and it consists, first, in the clamp for mounting the drill; second, in an improvement in the column for mounting the drill, all of which are fully described herein in connection with the accompanying drawings, in which—

Figure 1 is a vertical section of the chuck and clamp; Fig. 2, two views of one form of chuck; Fig. 3, a view of the column, of which the arm is shown in section; Fig. 4, a horizontal section of the arm and column.

Similar letters refer to similar parts throughout the several views.

A, Fig. 1, represents the body of a rock-drill, from the front end of which projects the piston-rod B, having an enlarged outer end, C, to receive the shank of the tool-holder D, the latter being secured in place by means of a key, G, in the customary manner.

Fig. 2 shows the side and end view of a particular chuck, in which the shank D is of nearly the same size as the body of the chuck, the front end of which has a longitudinal slit, *a a*, so that the jaws E E may be forced against the shank *b* of the tool by means of the bolts F F. The main features of this chuck are well known.

The clamp J I, Fig. 1, consists of two parts. The lower part, J, fitting the cylinder H, is of well-known form, and the other part, I, also fitting the same cylinder, has an annular seat, *c c*, for receiving an annular projection, L L, on the back of the slide N. The cross bar or plate M, for receiving the heads of the bolts *d d*, rests upon the inside of the projection L L, and, when free, permits the drill to be turned on the annulus *c c*, and also about the cylinder H, and thus secure universal motion. When the bolts *d d* are tightened, the slide N will be firmly held in any desired position. Loosening one of the bolts *d d* will generally free the clamp sufficiently to permit the universal movement.

P, Fig. 3, is a column of any well-known form, carrying an arm, H, on which the drill may be mounted. This arm, if made of cast-iron, is very liable to break, if sufficiently light to be portable. My improvement aims to secure a light arm of more tenacious metal, to accomplish which the arm H is made of steam or hydraulic pipe of suitable size, with one end, *h h*, fitted to the column P, so as to bear directly against it, and secured to it by means of the straps R R, one on each side of the arm, and passing outside the column P and through the half-clamp Q, and finally secured by means of the nuts *f f*. One end of the straps R R is secured to the arm H by means of a bolt or bolts, *e*. A tubular sleeve, *d d*, is inserted within the tubular arm, to prevent said bolt *e* from forcing the sides of the arm inward.

To raise and lower the drill when on the arm, a chain, *g*, secured in any suitable manner to the upper end of the column, extends down to a shaft or bar, *k*, under the arm H, so that when said chain is wound upon said bar *k* by means of the crank *l*, or in any other convenient manner, it will force said bar against the under side of the arm, and thereby raise it. The chain may also support the arm at any desired elevation while it is turned about the column to bring it into any desired position. This column is used chiefly where it can be forced between two stationary points by means of screws, as in tunnels and drifts.

What I claim, and desire to secure by Letters Patent, is—

1. The arm H, for supporting the drill, in combination with the column P, the inner end of the arm being fitted to the column and thereto secured by the straps R R, bolt *e*, and clamp Q, substantially as set forth.

2. The combination and arrangement of the clamp J I, having an annular seat, *c c*, for receiving a projection, L L, on the slide N of a rock-drill, with the cross-bar or plate M, and through-bolts *d d*, as and for the purposes set forth.

3. In a rock-drill, the combination, substantially as hereinbefore described, of the column P, arm H, having one end fitted thereto, and secured in position by the straps R R and brace Q, the shaft $k$, provided with means of rotation, and the chain $g$, arranged to be wound upon or from off the shaft, and thus raise or lower it and the arm H, substantially as shown and described.

DE VOLSON WOOD.

Witnesses:
MALCOLM W. NIVEN,
ROBERT H. THURSTON.